Jan. 11, 1944.   R. G. LE TOURNEAU   2,339,020
ELEVATOR TRUCK
Filed Sept. 19, 1942   3 Sheets-Sheet 3
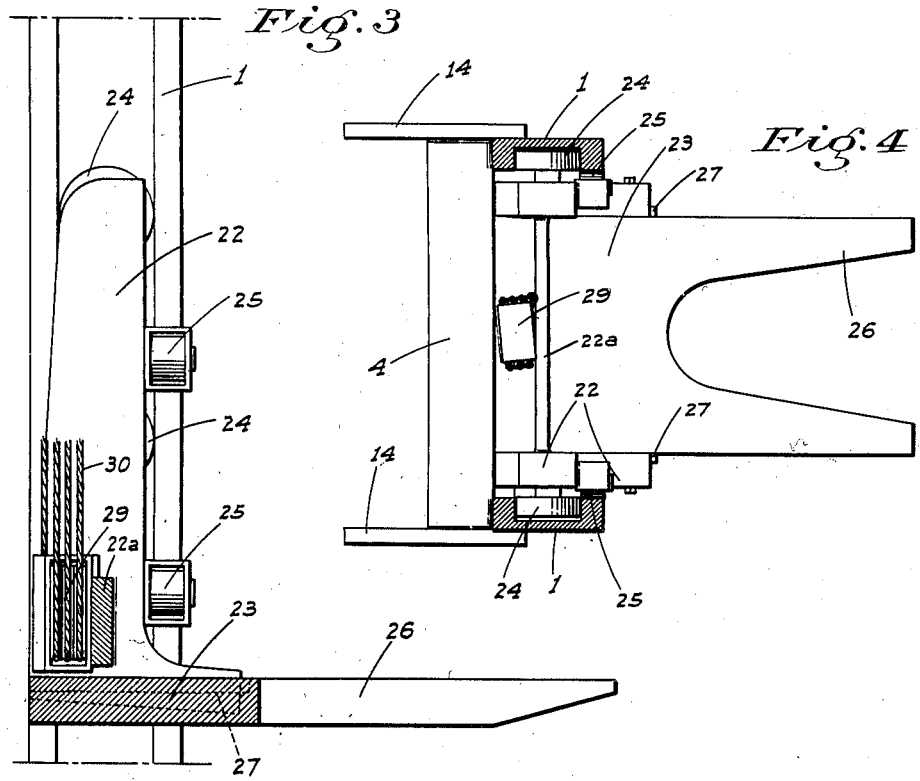
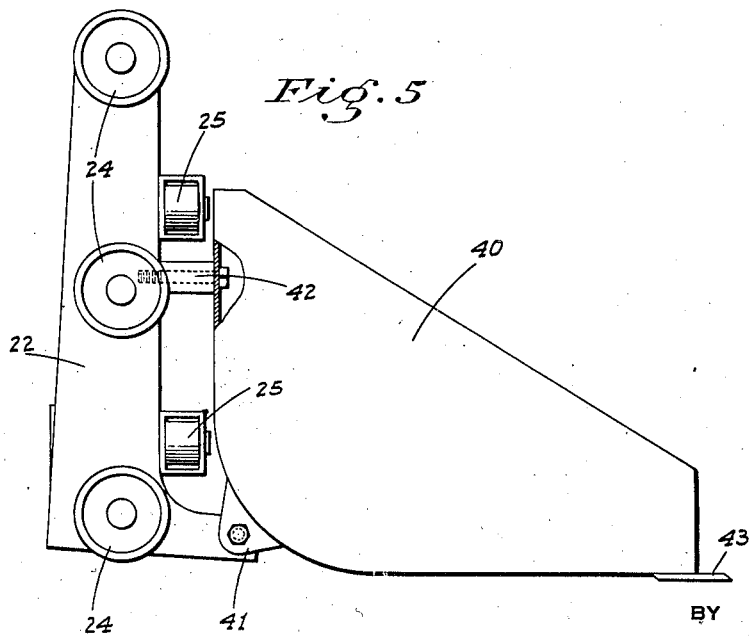
INVENTOR
R. G. LeTourneau
BY
ATTYS Patented Jan. 11, 1944

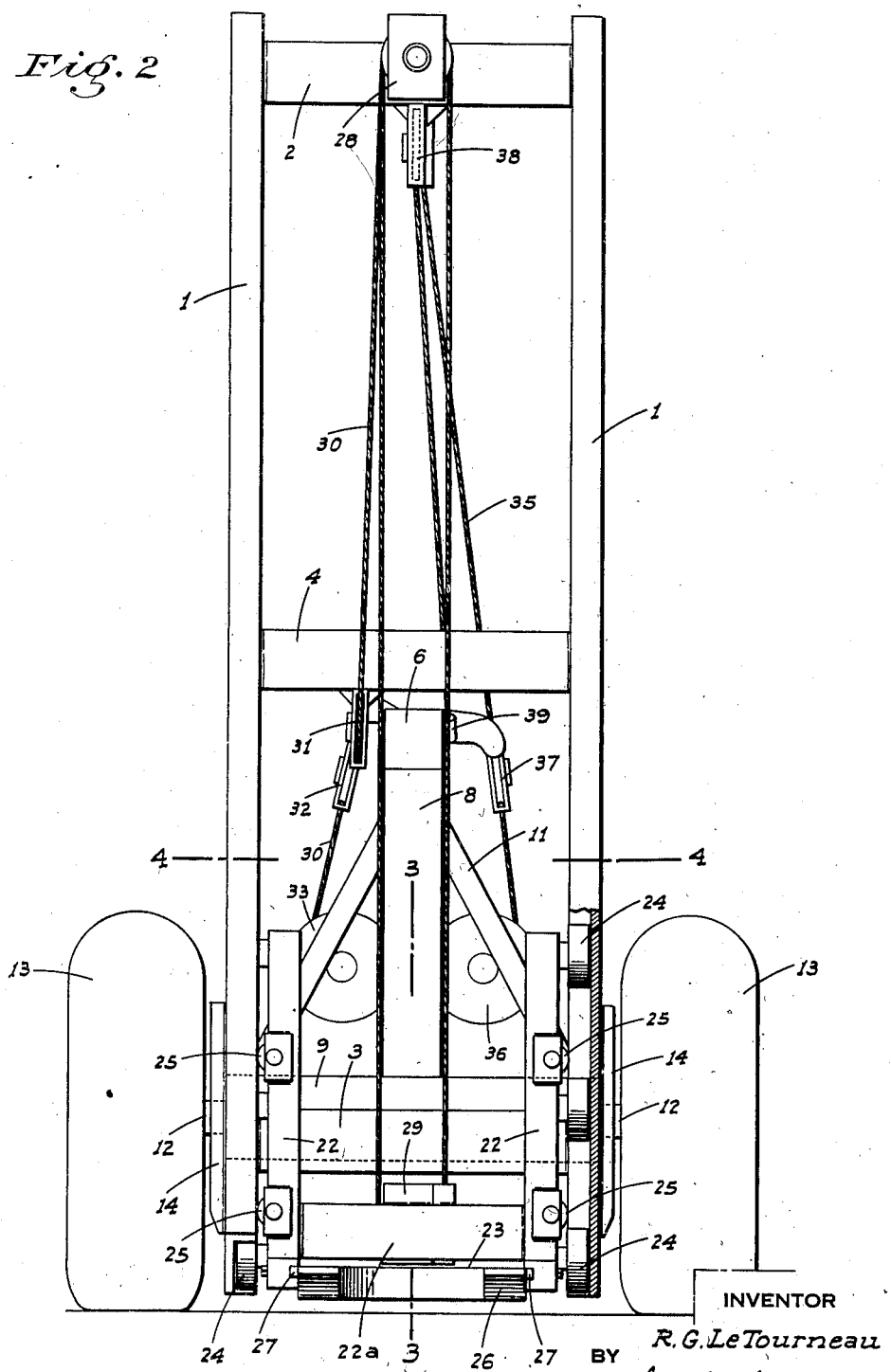

2,339,020

UNITED STATES PATENT OFFICE 2,339,020

ELEVATOR TRUCK

Robert G. Le Tourneau, Peoria, Ill., assignor to R. G. Le Tourneau, Inc., Stockton, Calif., a corporation of California Application September 19, 1942, Serial No. 458,967

5 Claims. (Cl. 214—113)

This invention relates in general to improvements in that type of self-propelled industrial vehicle known as a mobile elevator or elevator truck, and which is adapted for use to pick up and transport heavy and bulky loads.

This type of industrial vehicle conventionally includes a wheel supported vertical main frame including side members which serve as guide rails for a vertically movable carriage from the lower end of which a load pick up fork or the like projects rearwardly; such carriage being raised and lowered by suitable mechanism connected with the engine of the vehicle.

One of the objects of this invention is to embody in such an elevator truck, an upstanding main frame and elevator carriage assembly which is mounted for operator controlled forward and rearward tilting movement, whereby to dispose the pick-up fork or the like at a forward or rearwardly inclination, as desired. The advantage of this feature resides in the fact that when the load pick-up fork is at a forward inclination the center of gravity of the load is disposed forwardly to such extent that the load does not tend to slip off the pick-up fork with forward movement of the vehicle, and when the pick-up fork is at a rearward inclination discharge of the load is facilitated.

Another advantage of the forwardly and rearwardly tilting main frame and elevator carriage assembly is that with forward inclination of the load pick-up fork, the center of gravity of the load is moved toward the vertical center line or axis of the rear supporting wheels, reducing the tendency of the load to lift the vehicle at its forward end.

A further object of this invention is to provide an elevator truck which includes, in combination with the above tilting frame feature, a rearwardly opening scoop adapted to be substituted for the load pick-up fork, whereby the vehicle can be used to load sand, gravel, etc.; the forward and rearward tilting of the frame, together with the elevator carriage and scoop, facilitating loading, carrying and dumping of material by the scoop.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 2 is a rear end view of the elevator truck.

Figure 3 is a fragmentary sectional elevation on line 3—3 of Fig. 2.

Figure 4 is a fragmentary cross section on line 4—4 of Fig. 2.

Figure 5 is a side elevation of the elevator carriage detached from the vehicle and showing the pick-up scoop as mounted in connection with said carriage.

Figure 1:
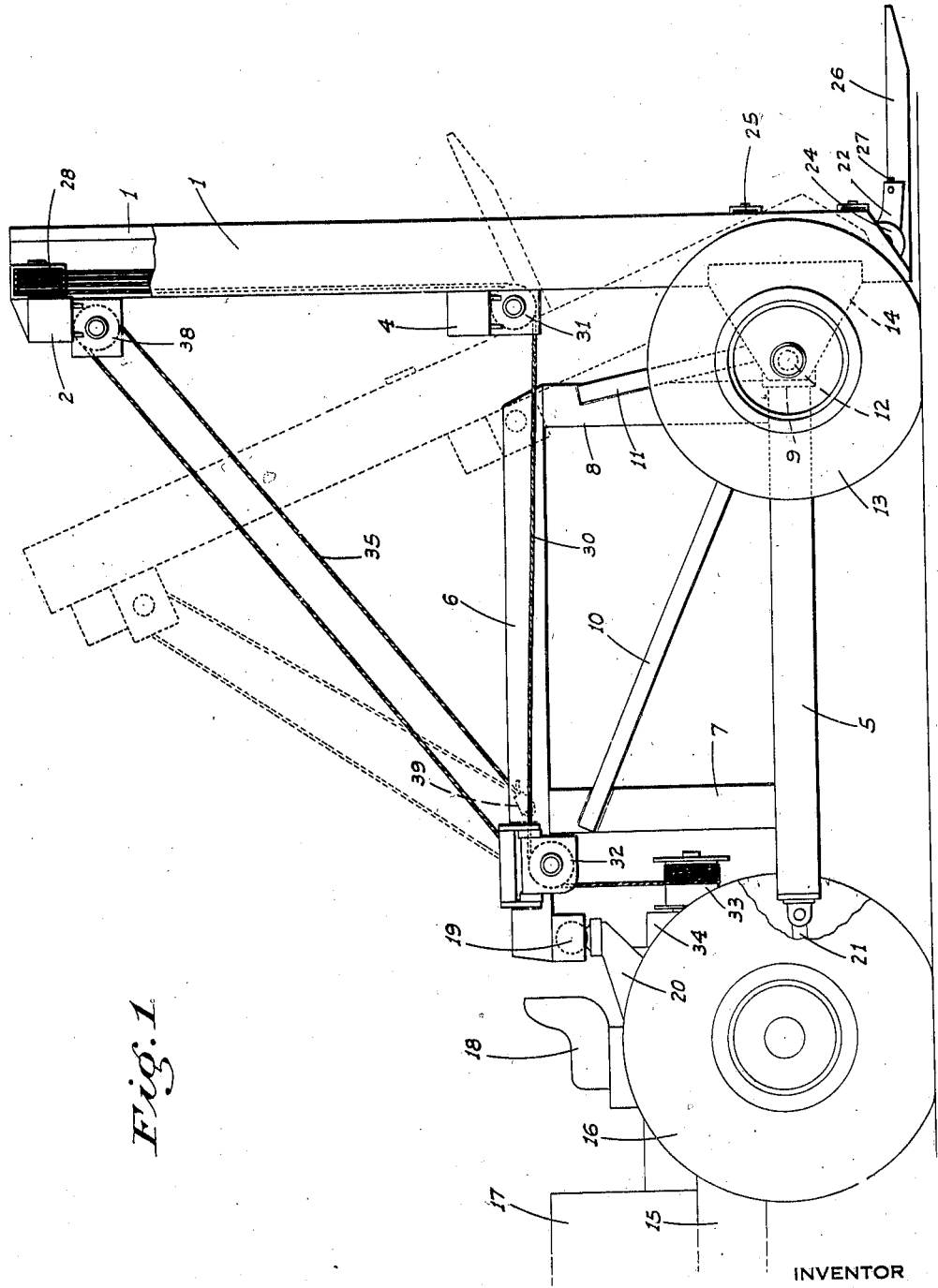
Figure 1 is a side elevation of the elevator truck.

Referring now more particularly to the characters of reference on the drawings, the elevator truck comprises a main upstanding frame which includes a pair of spaced parallel side beams 1 of channel configuration in cross section and disposed with the channels in facing relation. The side beams are connected at their upper ends by a rigid cross member 2, adjacent their lower ends by another cross member 3, and intermediate their ends by a third cross member 4. The cross members 2, 3 and 4 are secured to the side beams 1 at their forward edge, whereby said cross members do not obstruct the channels of side beams 1.

Disposed ahead of the above described main frame is a rigid draft frame which includes a horizontal bottom beam 5, and a horizontal top beam 6 disposed some distance thereabove; said beams being connected adjacent their forward end by a vertical post 7 and adjacent their rear end by another vertical post 8. A rigid horizontal axle beam 9 is secured centrally of its ends to the rear end of bottom beam 5 and projects some distance beyond both sides of the latter. Suitable bracing 10 and 11 extends from posts 7 and 8 respectively to axle beam 9.

At its outer ends the axle beam 9 is fitted with trunnions or stub axles 12 on which are mounted rubber tired wheels 13. Pivot or attachment plates 14 are fixed on side beams 1 adjacent the lower end thereof and project forwardly and are pivotally secured to the trunnions 12 between the wheels 13 and adjacent ends of axle beam 9.

At its forward end the rigid draft frame is coupled in draft relation to a tractor, which is here shown as being of two-wheel type which includes a frame 15, supporting wheels 16, an engine enclosing hood 17, and a driver's seat 18. The coupling between the rigid draft frame and the tractor comprises a ball and socket unit 19 between the forward end of top beam 6 and an upstanding bracket 20 on the rear of the tractor, and a swivel draft link 21 connected between the forward end of bottom beam 5 and the tractor below the wheel axis.

An elevator carriage which includes spaced, upstanding and parallel side bars 22 and a bottom cross plate 23, is disposed between the side beams 1. The carriage includes, and is guided for vertical movement by vertically spaced rollers 24 which ride in the channels of side beams 1, other vertically spaced rollers 25 which ride one flange of said side beams. A pick-up fork 26 projects rearwardly from cross plate 23 and, as shown, is formed integral with the latter. The fork and plate unit is removably mounted in connection with bars 22 by any suitable means, such means being here shown as comprising longitudinal side tongues 27 on plate 23 engaging in cooperating grooves in the bars 22 adjacent their lower end.

Vertical movement of the carriage relative to the upstanding side beams 1 of the main frame is accomplished by means of a multiple sheave block and tackle unit, the upper sheave block 28 of which is secured to cross member 2 centrally of the ends of the latter, while the lower sheave block 29 is secured on a cross beam 22a connecting the bars 22 just above plate 23. The actuating lead 30 of the block and tackle unit extends from the upper sheave block 28 downward about a sheave 31 fixed on cross member 4, thence extends forwardly alongside top beam 6 of the rigid draft frame, passes over a sheave 32 on post 7, and extends downward to wrap-around connection with one drum 33 of a two-drum power control unit or winch 34, of conventional design, mounted on the rear of the tractor and whose drums are selectively driven from the tractor engine. With rotation of drum 33 in one direction the elevator carriage, including the load pick-up fork 26, is raised relative to the main upstanding frame and included side beams 1, while rotation of the drum 33 in an opposite direction results in lowering of the elevator carriage and pick-up fork.

In order to swing the main frame forwardly, or rearwardly, about trunnions 12 as an axis, for the purpose of imparting forward or rearward inclination to the pick-up fork 26, the following mechanism is employed:

A cable 35 extends from the other drum 36 of the power control unit upwardly over a sheave 37 on the adjacent side of post 7, thence extends rearwardly and upwardly to a sheave 38 fixed on cross member 2, passes about said sheave 38, and extends forwardly and downwardly therefrom to an anchor 39 on top beam 6. With rotation of drum 36 of the power control unit in one direction or the other the operator can swing the upstanding main frame and included side beams 1 either forwardly or rearwardly about trunnions 12 as an axis, imparting a forward or rearwardly inclination respectively to the load pick-up fork. When a forward inclination is imparted to the load pick-up fork the tendency of a fork supported and elevated load to tip rearwardly off the fork is reduced to a minimum, and when the fork is lowered and a rearward inclination imparted thereto, the load can be discharged from the fork easier than if the fork were horizontal. Forward inclination is limited by engagement of cross beam 4 of the elevator frame with the top beam 6 of the draft frame, as indicated in Fig. 1.

In Fig. 5 the elevator carriage is shown without the plate 23 and pick-up fork 26; there being employed instead a rearwardly opening scoop 40 attached to the elevator carriage side bars 22 by suitable means, such as transversely spaced attachment ears 41 adjacent the bottom of the bowl, and transversely spaced attachment elements 42 adjacent the top of the bowl. The pick-up end of the scoop is fitted with a blade 43 to facilitate loading. When the scoop 40 is loaded the main frame is tilted forwardly to correspondingly tilt the scoop and prevent spilling of the load during carrying thereof. To dump the load the main frame is tilted rearwardly, which correspondingly tilts the scoop, permitting the load to fall therefrom.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tilt and elevating control mechanism for an elevator truck which includes a tractor trailing a draft frame, an elevator frame pivoted adjacent its lower end in connection with the rear portion of the draft frame for tilting movement lengthwise of the truck, and a vertically movable cable actuated load-supporting carriage mounted on said elevator frame; said control mechanism comprising a tilt control cable extending forwardly and downwardly from the upper end of the elevator frame, a separate carriage control cable extending forwardly from a direction-changing sheave mounted at a point on the elevator frame intermediate its ends and a substantial distance below its upper end whereby upon tilting of said elevator frame said sheave moves a relatively short distance as compared to the upper end of the elevator frame, and means on the tractor to separately actuate said cables and comprising a power winch mounted on the tractor at its rear end and said winch including two selectively operable cable drums to which said cables correspond and connect; the truck including a pair of sheaves mounted on the draft frame above and adjacent the power winch and over which sheaves corresponding ones of said cables run, the carriage control cable extending generally horizontally in a rearward direction from the corresponding one of said pair of sheaves to said one sheave on the elevator frame.

2. In an elevator truck which includes an elevator frame pivotally mounted for tilting movement lengthwise of the truck, a vertically movable elevator carriage mounted on said frame, and means to tilt said frame and move said carriage; a load supporting fork, a load supporting scoop, and means to secure said fork or said scoop, selectively, to the elevator carriage in rearwardly projecting relation thereto.

3. In an elevator truck, transversely spaced standards, an elevator carriage including transversely spaced side bars laterally inward of and slidably guided by the standards for vertical movement, a load supporting member comprising a plate fitting between the bars adjacent their lower end and longitudinal side tongues on the plate; the bars having grooves to slidably receive said tongues.

4. In an elevator truck, transversely spaced standards, an elevator carriage including transversely spaced side bars laterally inward of and slidably guided by the standards for vertical movement, a load supporting member comprising a plate fitting between the bars adjacent their lower end, means removably securing the bars and plate, a cross bar connecting the side bars immediately above but clear of the plate, and elevating means connected to said cross bar.

5. A structure as in claim 3, with rearward extensions on the bars at their lower end, the grooves extending to the rear end of said extensions and the tongues likewise projecting to the rear end of the grooves.

ROBERT G. LE TOURNEAU.